June 11, 1946.  L. L. CUNNINGHAM  2,401,861
CONTROL APPARATUS
Filed Aug. 25, 1942  2 Sheets-Sheet 1

Inventor,
LEWIS L. CUNNINGHAM
By John H. Rose,
Attorney

June 11, 1946.                L. L. CUNNINGHAM                    2,401,861
                               CONTROL APPARATUS
                             Filed Aug. 25, 1942                2 Sheets-Sheet 2
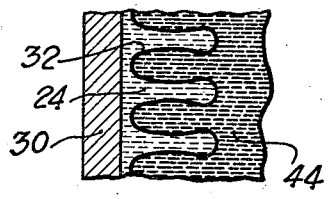
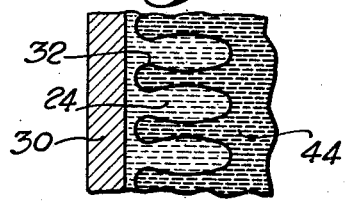
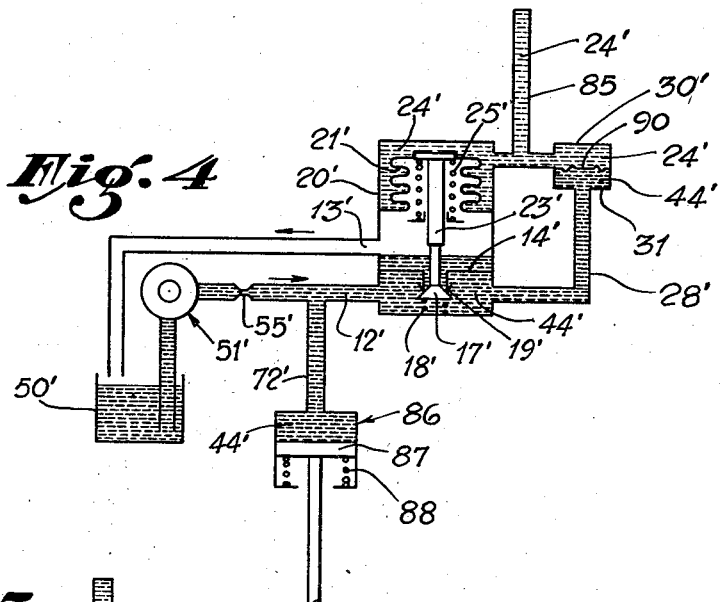
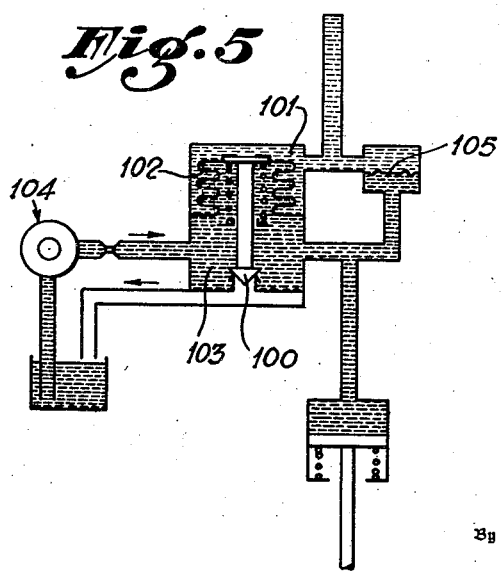
Inventor:
LEWIS L. CUNNINGHAM,
By John H. Rouse,
Attorney.

Patented June 11, 1946

2,401,861

UNITED STATES PATENT OFFICE 2,401,861

CONTROL APPARATUS

Lewis L. Cunningham, Los Angeles, Calif., assignors to General Controls Co., Glendale, Calif., a corporation of California Application August 25, 1942, Serial No. 456,008

8 Claims. (Cl. 236—86)

My present invention relates to control apparatus, and more particularly to apparatus for controlling fluid pressure in accordance with the variation of magnitude of a controlling condition. This invention, in certain respects, may be characterized as an improvement upon the invention disclosed in my copending application, Serial No. 454,387, filed August 11, 1942.

An object of this invention is to provide—in a fluid pressure system, the pressure of which is controlled by valve means operated in accordance with variations of a controlling condition, such as temperature or pressure—means, responsive to variation of pressure in the system, whereby the valve movement which produced such pressure variation is checked, so that a continuous "follow-up" action results.

Another object is the provision—in a system of the character described, and wherein the condition-responsive valve-operating means is in the form of a confined body of fluid, the pressure of which is varied by temperature, or by mechanical means such as a piston—of means whereby the effect of variation of pressure of the valve-controlled fluid is applied to the condition-responsive fluid in a sense opposing the maintenance of such change of pressure.

Another object is the provision, in a system of the character described in the preceding object, of means, including a yieldable partition separating the condition-responsive fluid and the valve-controlled fluid, whereby the condition-responsive fluid is rendered also responsive to the pressure of the valve-controlled fluid which it controls.

Another object is the provision of a system of the character described in the preceding object, wherein the yieldable partition, separating the condition-responsive and valve-controlled fluids, consists of the convoluted portion of an expansible-contractible cup-shaped metallic bellows; the distortion or "breathing" of the convolutions, when the bellows is subjected to differential pressure, affording the requisite degree of yieldability. An allied object is the provision of means for adjusting the position of the bellows head and thereby the capacity of the chamber containing the condition-responsive fluid.

Another object is the provision of a system, of the general character described and including a yieldable partition separating the controlling and controlled fluids, wherein the valve means is so arranged that variation of pressure of the controlled fluids acts on the partition in a sense tending to amplify the effect produced by the variation of pressure of the controlling fluid which caused the first-mentioned variation.

Still further objects and advantages of the invention will be found in the description, the drawings, and in the claims; and for complete understanding of the invention reference may be had to the following detailed description and accompanying drawings, wherein:

Figures 2 and 3 are enlarged views of like side-portions of the adjusting device indicated at 29 in Fig. 1, illustrating (in an exaggerated manner) the distortion of the bellows under varying pressure conditions;

Figure 4 is a simplified schematic view of the fluid pressure control system shown in Fig. 1; and Figure 5 is a similar view of a modified form of the fluid pressure system.

Figure 1:
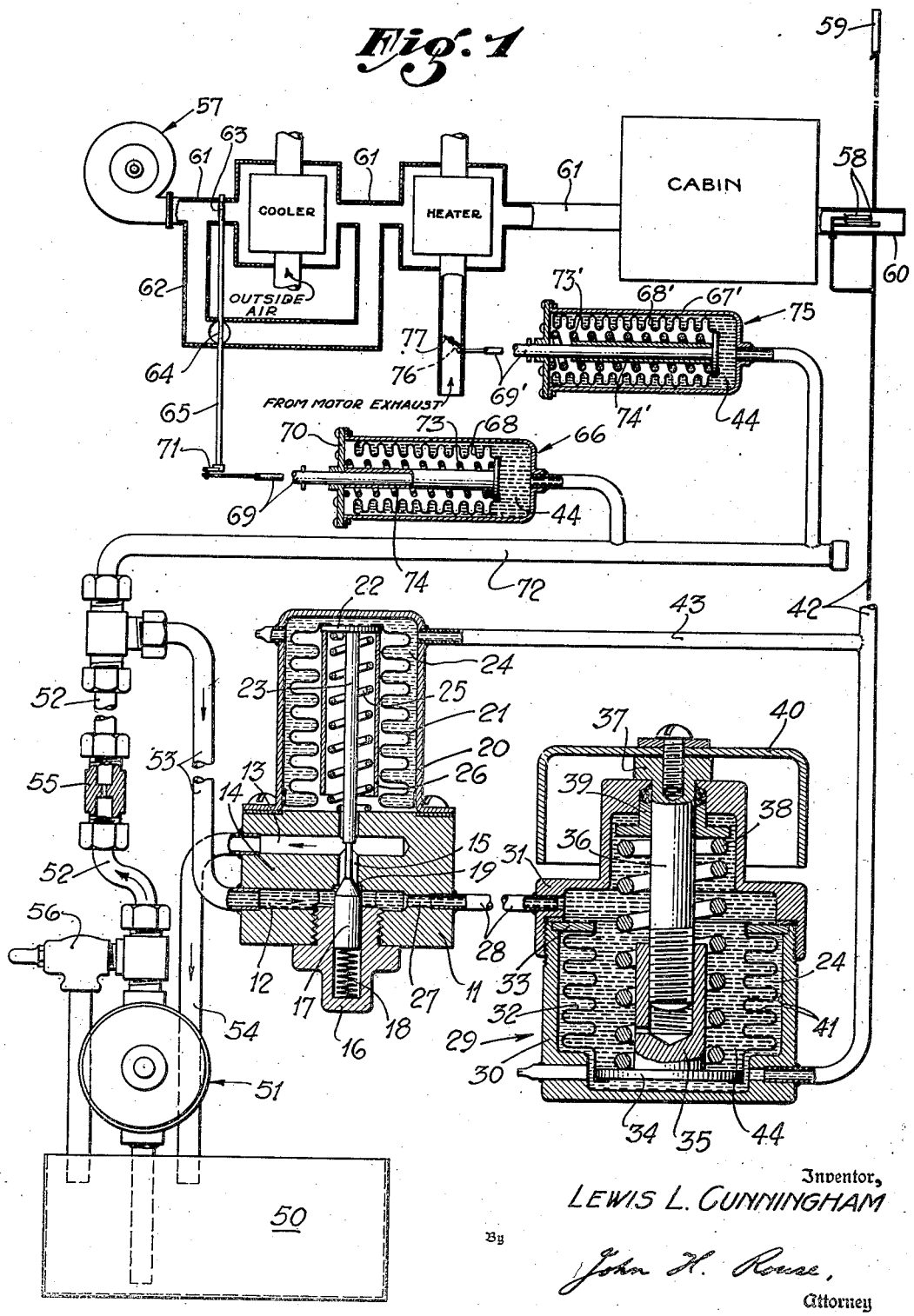
Figure 1 is a mainly-schematic view of a fluid pressure control system embodying my invention.

Referring first to Fig. 1 of the drawings, the numeral 11 indicates a valve casing having an inlet 12 and an outlet 13 separated by a partition portion 14 which is bored to provide a control passage 15 interconnecting the inlet and the outlet; the passage also extending through the top and the bottom wall of the casing. The lower extension of the passage 15 is enlarged and threaded to receive a plug 16 having a cylindrical recess for a closure member 17, the tapered upper surface of which is urged, by a compression spring 18 below the member, into engagement with a valve seat 19 formed around the control passage 15 at the underside of the partition 14. Sealingly mounted on the top surface of the valve casing is an inverted cup-shaped housing 20, within which is a generally-cylindrical metallic bellows 21 having a convoluted side wall. The bottom end of the bellows is secured, as by solder, to the housing, and its top end is similarly secured to the head 22 of a stem 23 which extends downwardly within the bellows and through the upper extension of passage 15. The lower extremity of stem 23 is adapted to engage the top of closure 17, the portion of this stem within the control passage 15 being reduced in diameter so as not to impede fluid flow through this passage. The space between the housing and the bellows is filled with liquid 24 and forms part of a sealed thermostatic system to be described further hereinafter. Urging the stem 23 upwardly is a spring 25 compressed between the stem- or bellows-head 22 and the casing; downward movement of the stem being limited by a sleeve 26 attached to the head 22. Formed as an extention of the inlet passage 12 is another passage 27, the enlargement of the lower extension of passage 15 permitting unobstructed communication between the passages 12 and 27 around the closure 17.

The passage 27 communicates, by a pipe 28, with the interior of a vessel generally indicated at 29 and comprising a lower cup-shaped section 30 on which is sealingly threaded a cap section 31. Within the lower section 30 is a metallic bellows 32 which is soldered at its upper end to a washer 33 clamped between the lower section and the cap 31; the other end of the bellows being similarly secured to the head portion 34 of a thrust member 35. Threaded in the hollow upper end portion of this member is a rod 36 which extends through an opening in the top wall of the cap section and is provided with a head 37 which is normally maintained in firm engagement with the outer surface of the cap by a relatively stiff spring 38 compressed between the thrust member 35 and a gland ring 39 provided around the inner upper end portion of the rod 36. For rotating rod 36, a hollow knob 40 is attached to its head portion 37. By adjustment of this knob, the thrust member 35 can be moved upward or downward to vary the capacity of the chamber 41 formed between the lower section 30 and the exterior of the bellows 32, including its "head" 34. This chamber communicates with the space between the valve bellows 21 and housing 20 by interconnected pipes 42 and 43, secured respectively in openings through the lower section 30 and the housing 20, and is filled with the same liquid 24. It is to be observed that the bellows 32 is not adapted to expand and contract along its axis (as does the valve bellows 21) in normal operation on account of the force of spring 38 acting on the thrust member 35, the head 34 of which also constitutes the head of bellows 32. The spring 38 serves as a safety strain release and is of such stiffness that it does not yield except under excessive pressure of the liquid 24 caused by some abnormal condition which will not be considered in the description of operation.

The interior of the bellows 32 and of the cap section 31, being in constant communication with the inlet 12 of the valve casing, is filled with the fluid (indicated by the numeral 44) supplied to the valve; this fluid, throughout the system, being shown by heavy broken lines to distinguish it from the liquid 24 which is shown by light broken lines. The fluid 44 is, in the present instance, considered to be a liquid (such as the oil commonly employed in the hydraulic system of an airplane) contained in a reservoir 50, from which it is withdrawn by a continuously-operated pump 51 and forced through pipes 52 and 53 to the inlet 12 of the valve; the liquid returning to the reservoir, when the closure 17 is unseated, through a pipe 54 connected to the valve outlet 13. A flow-restricting member 55 is inserted in pipe 52; and a relief valve 56, connected to the high-pressure side of the pump, serves to determine the maximum pressure in the hydraulic system.

By way of illustration, the system thus far described is shown, in the upper portion of Fig. 1, connected to control temperature conditions in the "pressurized" cabin of an airplane. A blower 57 is arranged to circulate air selectively around a "Cooler" (operated by outside air) or a "Heater" (operated by exhaust from the engine) and through the "Cabin" (these structures being indicated by legends) according to the demand of temperature responsive means comprising a plurality of thermal bulbs 58 and 59, connected in common; these bulbs being conveniently located in the air-outlet 60 of the cabin and in the outside air, respectively. The blower 57, which also serves as a supercharger for the cabin, is connected thereto by a duct 61 having enlargements for receiving the cooler and the heater units. By-passed around the portion of the duct wherein the cooler is located is another duct 62. In the portion of the duct 61 leading to the cooler is a damper 63 and in the by-pass duct 62 is another damper 64, these dampers being mounted on a common shaft 65 for simultaneous operation. As shown in the drawings, the damper 63 is in fully-closed position and the damper 64 fully open. For operating the damper shaft 65 there is provided a fluid pressure motor 66 comprising a cup-shaped housing 67 containing an expansible-contractible bellows 68 which is joined at one end to the housing wall and at its other end to the head of a stem 69 which extends within the bellows and through a guide opening in the left-hand end wall 70 of the housing, the extended end of the stem being connected to a crank 71 attached to the end of shaft 65. The area within the housing around the bellows and beyond the head of stem 69 communicates with a pipe 72, which is an extension of the high-pressure supply pipe 52, so that the fluid pressure in the motor 66 is determined by the position of the closure 17 with respect to its seat; maximum pressure being exerted in the motor when the closure is seated. The pressure of the liquid 44 acting on the bellows head is opposed by the force of a spring 73, the stem in its movement accordingly assuming a position wherein these forces are balanced; movement of the stem in a left-hand direction being limited by the engagement with the motor end-wall 70 of a sleeve 74 which surrounds an inner portion of the stem, the parts being shown in that limiting position in the drawing. Also connected to the pipe 72 is another fluid pressure motor 75 which is substantially identical in construction with the motor 66; the parts of motor 75 therefore being indicated by the numerals assigned to the corresponding parts of motor 66, but with a prime mark added. The only difference between the motors 66 and 75 is in their springs, the force of spring 73' being considerably greater than that of spring 73. The motor 75 is "pre-loaded" by its spring 73', so that movement of stem 69', due to increase of fluid pressure can occur only after stem 69 of motor 66 has reached its limiting position, as shown. Connected to the outer end of stem 69' of motor 75, by a crank 76, is a damper 77 which is adapted to control the supply of exhaust gas to the cabin heater; this damper being shown in the drawings in slightly-opened position.

For the purpose of describing the operation of the cabin temperature control system, shown in the upper portion of Fig. 1, it will be assumed that the fluid pressure in the pipe 72, and hence in the motors 66 and 75, is constantly varied as an inverse function of the average temperature at the thermal bulbs 58 and 59—the operation of the means, shown in the lower portion of the figure, for accomplishing that result, will be described hereinafter. If the temperature at the thermal bulbs is high, there is minimum fluid pressure in the motors 66 and 75 and their operating stems are therefore retracted, so that the damper arm 65 is in a position 90° from that shown. Damper 63 then being open and damper 64 closed, air passes to the cabin around both the cooler and the heater; however, since damper 77 is closed, no heat is supplied to the heater and the air (which is usually quite warm as it leaves the blower or supercharger 57) is cooled. With resultant fall of temperature at the thermal bulbs, the fluid pressure in the motors is increased and the stem 69 of motor 66 is moved outwardly, the damper shaft 65 being rotated to a position wherein damper 63 is partly closed and damper 64 partly open, some air now passing through the by-pass duct 62 and less air passing around the cooler. If the cabin temperature continues to fall, the stem 69 of motor 66 finally reaches its limiting position (as shown) wherein passages of air around the cooler is completely obstructed, all the air passing through the by-pass duct. Still continued fall of cabin temperature now effects opening of the heater damper 77 by motor 75, this motor being so preloaded (as was described) that movement of its stem 69' can occur only after the stem 69 of motor 66 has reached the limit of its outward travel. The heating of the cabin is now solely under the control of motor 75 which serves to vary the amount of engine exhaust gas supplied to the heater, according to the demand of the temperature responsive means.

Before describing the operation of the fluid pressure control system shown in the lower portion of Fig. 1, the effect of fluid pressure difference on opposite sides of the convoluted side wall of a bellows will be considered. This effect is shown, in an exaggerated degree, in Figs. 2 and 3, which are fragmentary views of the lower left-hand portion of the regulating device 29. When the pressure of the fluid 44 within the bellows is greater than that of the fluid 24 at its outer side, the convolutions are distorted as shown in Fig. 2; the effect of reversal of these pressures being shown in Fig. 3. This distortion is referred to in the bellows art by the term "breathing" and has heretofore been considered as productive of no useful result. However, in the present invention, advantage is taken of the fact that, due to this phenomenon, limited variation of capacity of the chambers defined in part by the bellows side wall is effected by variation of differential pressure thereacross.

The operation of the fluid pressure system shown in Fig. 1 can better be described by reference to the simplified equivalent showing of Fig. 4. In this figure most of the parts have been assigned the same numerals as those of the clearly-equivalent parts shown in Fig. 1 (these numerals in Fig. 4, however, being primed) and will not further be identified. In Fig. 4, the thermal bulbs 58 and 59 of Fig. 1 (together with the connecting pipes 42 and 43) are represented by a tubular member or bulb 85; the motors 66 and 75 by a single motor 86 having a piston 87 biased by a spring 88; and the convoluted portion (only) of the bellows 32 by a diaphragm 90, which may be considered to be of relatively stiff metal so that it can flex, or yield, to a limited extent in either direction when subjected to differential pressure. The diaphragm 90 (or the convoluted side wall of bellows 32) constitutes the "yieldable partition" or wall, referred to in the claims, which separates the chambers containing the "control" fluid 24' and the "pressure" fluid 44'.

The positions of the parts, as shown in Fig. 4, are those assumed when the closure 17' is in close proximity to its seat 19' so that but a small amount of the fluid 44' can circulate in the direction of the arrows. The pressure drop across the seat is therefore high and the pressure of the fluid 44' throughout the system correspondingly high, so that the motor piston 87 is in partly-projected position. If the temperature at the thermal bulb 85 rises, the resultant expansion of the fluid 24' effects downward movement of the closure 17', thereby reducing the pressure of the fluid 44' acting upwardly on the diaphragm 90. The resultant downward flexure of this diaphragm increases the volume, or capacity, of the space in which the fluid 24' is confined, so that the pressure of this fluid is decreased and the closure therefore tends to resume its previous position. A similar "pressure follow-up" effect is produced with fall of temperature—upward movement of the closure effecting increase of fluid pressure below the diaphragm so that the resultant upward movement of the same tends to restore the pressure of the fluid above it. It is thus seen that movement of the closure in either direction effects a change of pressure below the diaphragm such that the closure movement which produced the change is checked. Of course, this pressure-follow-up effect does not prevent continued movement of the closure if the temperature at the thermal bulb continues to change in spite of the effect produced on the temperature-changing means (the cooler or heater of Fig. 1) by the operation of motor 86; the closure, in response to continued rise of temperature, finally reaching a position wherein (due to the limited flow permitted by the restriction 55') the pressure drop across the valve seat is negligible and the pressure of the fluid 44' therefore substantially atmospheric, so that the piston 87 of motor 86 is in its fully-raised position. If the temperature at the thermal bulb becomes very low, the bellows stem 23' rises out of engagement with the closure so that the same is held tightly on its seat by the pressure of the fluid below it and maximum pressure is therefore applied to motor 86. Within the normal range of operation, there is continuous flow of fluid through the valve, and the pressure of the controlled fluid is an inverse function of the temperature—regardless of change of viscosity of the controlled fluid (if the same is a liquid) since the effect of such change (upon the pressure of the fluid) is applied to the diaphragm 90 in a sense tending to adjust the closure to a compensating position. Calibration of the temperature-responsive fluid system is effected by rotation of the knob 40 of the regulating device 29 shown in Fig. 1, whereby, as was previously mentioned, the capacity of the chamber 41 (which forms part of this fluid system) can be varied.

The pressure fluid 44' controlled by the valve is preferably liquid, but, if desired, may be of the elastic type such as air—at either superatmospheric or subatmospheric pressure. If a vacuum pump is substituted for the "positive" pressure device 51', the closure and valve seat are then so arranged that downward movement of the bellows head effects closure of the valve, the position of the flow restriction being correspondingly changed. Likewise, the temperature responsive fluid 24' is preferably thermoexpansive liquid, so that the pressure produced by it on the movable wall, or bellows head, is substantially directly proportional to the temperature; however, if desired, a charge of vaporizable fluid may be substituted.

The modified form of fluid pressure control system shown in Fig. 5 is generally similar to that disclosed in my hereinabove-mentioned copending application, Serial No. 454,387. In this system, a closure 100, operated by the pressure of fluid 101 above a bellows 102, is arranged to control the fluid 103 circulated, in the direction of the arrows, by a pump 104. The pressure of the controlled fluid 103 acts on the underside of the bellows head and thereby produces a pressure-follow-up effect somewhat similar to that described in connection with Fig. 4; downward movement, for example, of the closure effecting increase of pressure of the controlled fluid acting upwardly on the bellows head, so that movement of the closure is checked—it being assumed that, if the fluid 101 above the bellows is liquid, some portion of the wall of its container can yield to permit the requisite slight upward movement of the bellows head. It has been found that when the volume of the chamber wherein the control fluid 101 is confined is relatively large, on account of the compressibility of the fluid (even if the same is liquid) or the inherent yieldability of the chamber wall, the differential of operation of the closure, produced by the follow-up action of the controlled fluid, may become excessive. To reduce the degree of this differential of operation, the controlled fluid 103 is arranged to act also on a diaphragm or partition 105 which forms part of the wall of the chamber for the control fluid 101. The effect of the upward pressure of the controlled fluid on this diaphragm therefore opposes its effect on the underside of the bellows head, and, by suitable proportioning of the area of the diaphragm, the desired degree of differential of operation can thus be obtained.

While I have herein shown and described specific embodiments of my invention, I wish it to be understood that modification may be made without departing from the spirit of the invention, and that I intend therefore to be limited only by the scope of the appended claims.

I claim as my invention:

1. In condition-controlled apparatus: means defining a pair of pressure chambers separated by a yieldable partition; one of said chambers being closed and having a movable wall mechanically separate from said partition; control fluid in said one of the chambers; means for varying the pressure of said control fluid, in accordance with variations of a controlling condition, to move said wall; a source of fluid pressure differing from atmospheric; means, including a flow restriction, continuously connecting said source to said other of the chambers; a flow connection between said other of the chambers and the atmosphere; a throttling valve in said connection and operated by the movement of said wall; said throttling valve operating, in response to movement of said wall in a given direction, to effect such variation of pressure in said other of the chambers that, by the yielding of said partition, the pressure in said one of the chambers is varied in a sense tending to arrest such movement of the wall; and control means connected to said other of the chambers and actuated in response to variation of fluid pressure therein.

2. In condition-controlled apparatus: means defining a pair of pressure chambers separated by a yieldable partition; one of said chambers being closed and having a movable wall mechanically separate from said partition; control fluid in said one of the chambers; means for varying the pressure of said control fluid, in accordance with variations of a controlling condition, to move said wall; a source of fluid at superatmospheric pressure; means, including a flow restriction, continuously connecting said source to said other of the chambers; a flow connection between said other of the chambers and the atmosphere; a throttling valve in said connection and operated by the movement of said wall; said throttling valve opening in response to increase of pressure of said control fluid so that the pressure in said other of the chambers is then reduced and, by the yielding of said partition, the pressure in said one of the chambers is correspondingly reduced so that the movement of said wall is arrested; and control means connected to said other of the chambers and actuated in response to variation of fluid pressure therein.

3. In condition-controlled apparatus: means defining a pair of pressure chambers separated by a movable partition; one of said chambers being closed and having a movable wall mechanically separate from said partition; control fluid in said one of the chambers; means for varying the pressure of said control fluid, in accordance with variations of a controlling condition, to move said wall; means accessible from the exterior of said chambers for adjusting the position of said movable partition and thereby the capacity of said one of the chambers, a portion of said partition being yieldable to a limited extent in response to variation of fluid pressure difference on the opposite sides thereof; a source of fluid pressure differing from atmospheric; means, including a flow restriction, continuously connecting said source to said other of the chambers; a flow connection between said other of the chambers and the atmosphere; a throttling valve in said connection and operated by the movement of said wall; said throttling valve operating, in response to movement of said wall in a given direction, to effect such variation of pressure in said other of the chambers that, by the yielding of said partition-portion, the pressure in said one of the chambers is varied in a sense tending to arrest such movement of the wall; and control means connected to said other of the chambers and actuated in response to variation of fluid pressure therein.

4. In condition-controlled apparatus: means defining a pair of pressure chambers separated by a movable partition, said partition comprising an expansible-contractible cup-shaped bellows having a convoluted side-wall and a rigid end-wall; one of said chambers being closed and having a main movable wall mechanically separate from said partition; control fluid in said one of the chambers; means for varying the pressure of said control fluid, in accordance with variations of a controlling condition, to move said main wall; means accessible from the exterior of said chambers for adjusting the position of said bellows end-wall and thereby the capacity of said one of the chambers; a source of fluid pressure differing from atmospheric; means, including a flow restriction, continuously connecting said source to said other of the chambers; a flow connection between said other of the chambers and the atmosphere; a throttling valve in said connection and operated by the movement of said main wall; said throttling valve operating, in response to movement of said main wall in a given direction, to effect such variation of pressure in said other of the chambers that, due to the resultant "breathing" of the convolutions of said side-wall of the bellows, the pressure in said one of the chambers is varied in a sense tending to arrest such movement of the main wall; and control means connected to said other of the chambers and actuated in response to variation of fluid pressure therein.

5. In condition-controlled apparatus: means defining a pair of pressure chambers separated by a movable partition, said partition comprising an expansible-contractible cup-shaped bellows having a convoluted side-wall and a rigid end-wall; one of said chambers being closed and having a main movable wall mechanically separate from said partition; control fluid in said one of the chambers; means for varying the pressure of said control fluid, in accordance with variations of a controlling condition, to move said main wall; means accessible from the exterior of said chambers for adjusting the position of said bellows end-wall and thereby the capacity of said one of the chambers; a source of fluid at superatmospheric pressure; means, including a flow restriction, continuously connecting said source to said other of the chambers; a flow connection between said other of the chambers and the atmosphere; a throttling valve in said connection and operated by the movement of said main wall; said throttling valve opening in response to increase of pressure of said control fluid so that the pressure in said other of the chambers is then reduced and, due to the resultant "breathing" of the convolutions of said side-wall of the bellows, the pressure in said one of the chambers is correspondingly reduced so that the movement of said main wall is arrested; and control means connected to said other of the chambers and actuated in response to variation of fluid pressure therein.

6. In condition-controlled apparatus: means defining a pair of pressure chambers separated by a movable partition; one of said chambers being closed and having a movable wall mechanically separate from said partition; control fluid in said one of the chambers; means for varying the pressure of said control fluid, in accordance with variations of a controlling condition, to move said wall; a portion of said partition being yieldable to a limited extent in response to variation of fluid pressure difference on the opposite sides thereof; a source of fluid pressure differing from atmospheric; means, including a flow restriction, continuously connecting said source to said other of the chambers; a flow connection between said other of the chambers and the atmosphere; a throttling valve in said connection and operated by the movement of said wall; said throttling valve operating, in response to movement of said wall in a given direction, to effect such variation of pressure in said other of the chambers that, by the yielding of said partition-portion, the pressure in said one of the chambers is varied in a sense tending to arrest such movement of the wall; and control means connected to said other of the chambers and actuated in response to variation of fluid pressure therein.

7. In condition-controlled apparatus: means defining a pair of pressure chambers separated by a movable partition, said partition comprising an expansible-contractible cup-shaped bellows having a convoluted side-wall and a rigid end-wall; one of said chambers being closed and having a main movable wall mechanically separate from said partition; control fluid in said one of the chambers; means for varying the pressure of said control fluid, in accordance with variations of a controlling condition, to move said main wall; a source of fluid pressure differing from atmospheric; means, including a flow restriction, continuously connecting said source to said other of the chambers; a flow connection between said other of the chambers and the atmosphere; a throttling valve in said connection and operated by the movement of said main wall; said throttling valve operating, in response to movement of said main wall in a given direction, to effect such variation of pressure in said other of the chambers that, due to the resultant "breathing" of the convolutions of said side-wall of the bellows, the pressure in said one of the chambers is varied in a sense tending to arrest such movement of the main wall; and control means connected to said other of the chambers and actuated in response to variation of fluid pressure therein.

8. In condition-controlled apparatus: means defining a pair of pressure chambers separated by a movable partition, said partition comprising an expansible-contractible cup-shaped bellows having a convoluted side-wall and a rigid end-wall; one of said chambers being closed and having a main movable wall mechanically separate from said partition; control fluid in said one of the chambers; means for varying the pressure of said control fluid, in accordance with variations of a controlling condition, to move said main wall; a source of fluid at superatmospheric pressure; means, including a flow restriction, continuously connecting said source to said other of the chambers; a flow connection between said other of the chambers and the atmosphere; a throttling valve in said connection and operated by the movement of said main wall; said throttling valve opening in response to increase of pressure of said control fluid so that the pressure in said other of the chambers is then reduced and, due to the resultant "breathing" of the convolutions of said side-wall of the bellows, the pressure in said one of the chambers is correspondingly reduced so that the movement of said main wall is arrested; and control means connected to said other of the chambers and actuated in response to variation of fluid pressure therein.

LEWIS L. CUNNINGHAM.